United States Patent [19]

Stowe

[11] Patent Number: 5,102,160
[45] Date of Patent: Apr. 7, 1992

[54] CONNECTOR ASSEMBLY FOR A STABILIZER BAR

[75] Inventor: Keith A. Stowe, Saginaw, Mich.

[73] Assignee: General Motors Corporation, Detroit, Mich.

[21] Appl. No.: 618,862

[22] Filed: Nov. 28, 1990

[51] Int. Cl.⁵ .................... B60G 11/20; B60G 11/60
[52] U.S. Cl. .................................. 280/689; 280/716; 280/723; 267/276; 267/152
[58] Field of Search ............. 280/688, 689, 695, , 280/700, 716, 717, 721, 723; 267/273, 276, 153, 154, 292, 152; 296/36, 35.1; 248/251, 560, 634, 635

[56] References Cited

U.S. PATENT DOCUMENTS

| | | | |
|---|---|---|---|
| 2,245,809 | 6/1941 | Olley | 280/721 |
| 2,455,606 | 12/1948 | Pleiss | 248/251 |
| 2,825,576 | 3/1958 | Allison | 280/104 |
| 3,023,992 | 3/1962 | Tisdall | 248/251 |
| 3,104,097 | 9/1963 | Kozicki | 267/57 |
| 3,181,885 | 5/1965 | Baracos et al. | 280/723 |
| 3,198,507 | 8/1965 | Kozicki | 267/57 |
| 3,419,101 | 12/1968 | Allison | 180/73 |
| 3,713,611 | 1/1973 | Voigt | 248/635 |
| 3,829,120 | 8/1974 | Redding, Jr. | 280/124 B |
| 3,831,966 | 8/1974 | Grosseau | 280/124 B |
| 3,975,038 | 8/1976 | Allison | 280/700 |
| 4,143,887 | 3/1979 | Williams et al. | 280/697 |
| 4,159,043 | 6/1979 | James | 248/634 |
| 4,664,408 | 5/1987 | Saotome et al. | 280/721 |
| 4,875,703 | 10/1989 | Murakami | 280/665 |

Primary Examiner—Charles A. Marmor
Assistant Examiner—Tamara L. Finlay
Attorney, Agent, or Firm—A. Michael Tucker

[57] ABSTRACT

A connector assembly for attaching an end of a rotatable stabilizer bar to a control arm includes a cap member and a nut member. The cap member includes a barrel portion for receiving a stabilizer bar and a central stem. An annular, resilient base surrounds the stem and yieldably supports the cap member on a first surface of a control arm. A threaded bolt extends from the stem. The nut member includes a stem having a complementary sleeve for receiving the bolt and an annular, resilient base for supporting the nut member on a second surface of the control arm. Preferably, both the cap and nut members are molded from a resilient material.

9 Claims, 2 Drawing Sheets

CONNECTOR ASSEMBLY FOR A STABILIZER BAR

BACKGROUND OF THE INVENTION

1. FIELD OF THE INVENTION

The present invention relates generally to automotive suspension systems and, in particular, is concerned with a connector assembly for attaching a stabilizer bar to a control arm.

2. STATEMENT OF THE RELATED ART

The use of roll stabilizer bars in automotive wheel suspension systems is well-known. Generally, brackets are used to mount a stabilizer bar to a frame and end links are used to attach the ends of the stabilizer bar to respective control arms. When a control arm moves as a result of a road input, the end link transmits all or part of the movement to the stabilizer bar. The spring effect of the stabilizer bar is then transmitted through an opposite end link to a control arm on the other side of the vehicle to resist the rolling motion of the vehicle.

During operation, the control arm pivots about a line through its mounting points to the frame. As a result, the attachment point where the end link is attached to the control arm moves through an arc. A common method of allowing this movement to occur permits the end link to rotate relative to the control arm. As the attached end of the stabilizer bar moves through an arc, the central portion of the stabilizer bar pivots or rotates about a line through its mounting points to the frame. Therefore, the end link must also accommodate angular movement of an attached end of the stabilizer bar as the central portion of the bar rotates due to road inputs.

Many conventional stabilizer bars terminate at each end in a paddle or eyeform with a hole to receive a bolt or threaded weld stud. The end link is placed on the bolt and secured with a nut. The end link often includes an elastomeric bushing and metal sleeve to permit the linkage to rotate relative to the stabilizer bar.

Other end link assemblies have been developed for tubular stabilizer bars. A common assembly includes a metallic link lined with an elastomeric bushing for receiving the stabilizer bar. The link is mounted to a control arm with rubber grommets and retained by a nut.

The art continues to seek improvements. It is desirable to eliminate the costly eyeforms on the ends of the stabilizer bar and provide quick attachment of the ends of stabilizer bars to control arms or supports. A new design for the connection between a stabilizer bar and a control arm must accommodate the angular motions of the control arm and the connected ends of the stabilizer bar and the rotational movement of the central portion of the stabilizer bar.

SUMMARY OF THE INVENTION

The present invention provides an improved connector assembly for attaching an end of a rotatable stabilizer bar to a pivotable control arm. The improved connector assembly eliminates costly eyeforms in the ends of the stabilizer bar. The present connector assembly includes elements which can be economically molded from a suitable plastic material and is suitable for use with conventional stabilizer bars and control arms.

In a preferred embodiment, the present connector assembly includes a cap member having a barrel portion for receiving a stabilizer bar and a central stem. An annular, resilient base surrounds the stem and yieldably supports the cap member on a first surface of a control arm. A threaded bolt extends from the stem. A nut member includes a stem having a complementary sleeve for receiving the bolt and an annular, resilient base for supporting the nut member on a second surface of the control arm. Preferably, both the cap and nut members are molded from a resilient material.

DETAILED DESCRIPTION OF THE PREFERRED EMBODIMENT

Figure 1:
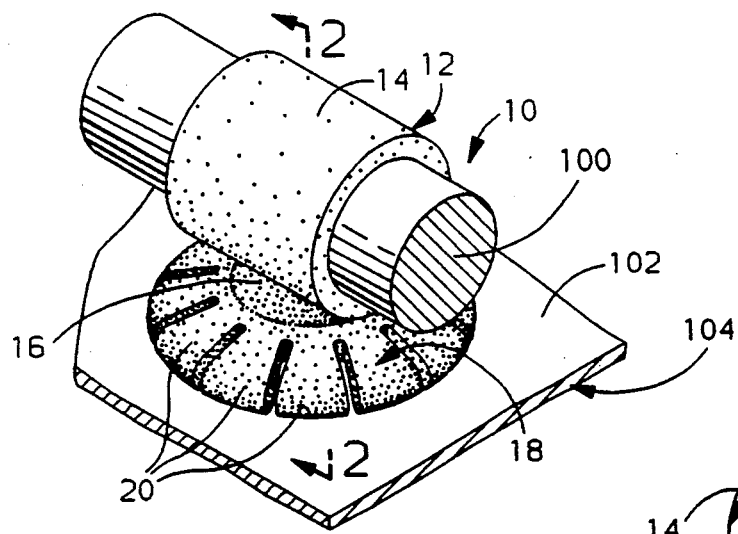
FIG. 1 is a perspective view of a preferred embodiment of a connector assembly mounting a stabilizer bar on a control arm.
Figure 2:
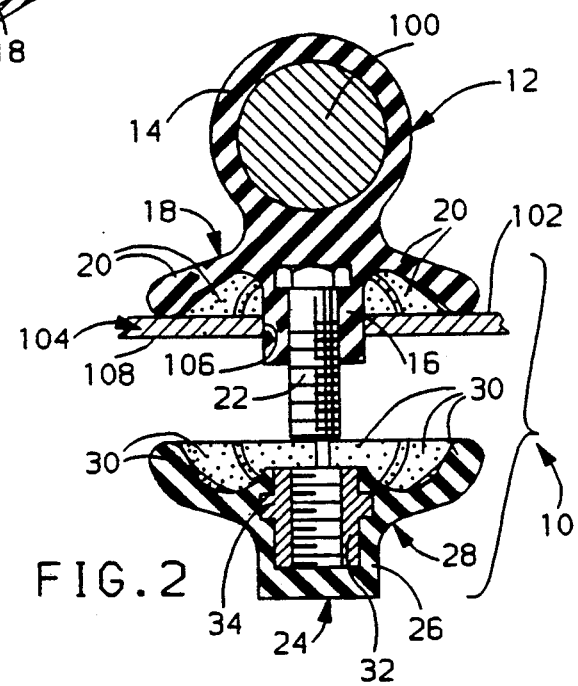
FIG. 2 is an exploded sectional view taken along line 2—2 of FIG. 1 illustrating the cap and nut members of the connector assembly.

A connector assembly indicated generally at 10 is illustrated in FIGS. 1 and 2. The assembly 10 includes a cap member indicated generally at 12 having a hollow barrel portion 14 and a central body or stem 16. The barrel portion 14 receives an end of a tubular stabilizer bar 100 and preferably permits the stabilizer bar 100 to rotate as described below. In the figures, the cross sections of the stabilizer bar 100 and the barrel portion 14 are illustrated as circular. If a stabilizer bar has a non-circular cross section (e.g., rectangular), then the barrel portion 14 can be formed with a complementary cross section.

Surrounding the stem is an annular, resilient base indicated generally at 18. Preferably, the base 18 is slitted to form a plurality of tabs 20. The tabs 20 rest upon an upper surface 102 of a control arm 104 when the stem 16 is inserted in a mounting opening 106 in the control arm 104 (illustrated best in FIGS. 2 and 5). The base 18 and the tabs 20 support the cap member 12 as the stabilizer bar 100 shifts during use as described below.

Preferably, the barrel portion 14, the stem 16 and the base 18 are integrally molded from any suitable material so that each of the elements is resilient and yieldable. Most preferably, the material is a low-friction polymer to accommodate the rotation of the stabilizer bar 100 within the barrel portion 14.

The cap member 12 includes a first or male fastener illustrated as a threaded bolt 22. The bolt 22 is retained and positioned within the stem 16 so that a threaded portion projects downwardly through the mounting opening 106 as illustrated in FIG. 2. Preferably, the bolt 22 is positioned in the stem 16 during the molding process.

A nut member indicated generally at 24 includes a central body or stem 26 and an annular, resilient base indicated generally at 28. Preferably, the base 28 is slitted to form a plurality of tabs 30 illustrated best in FIG. 3. In a preferred embodiment, the stem 26 and the base 28 are integrally molded from a suitable material to provide resiliency and yieldability.

A second or female fastener, illustrated as threaded sleeve 32, complementary to the threaded bolt 22, is retained within the stem 26, preferably during the molding process. An outer, circumferential flange 34 can be provided on the sleeve 32 to enhance the retention of the sleeve 32 within the stem 26.

To assemble, an end of the stabilizer bar 100 is inserted into the barrel portion 14 of the cap member 12. The cap member 12 is positioned on the control arm 104 so that the stem 16 and the bolt 22 project through the opening 106 and the base 18 rests on the upper surface 102. The nut member 24 is removably secured to the cap member 12 as the sleeve 32 is threaded onto the bolt 22 until the base 28 engages a lower surface 108 of the control arm 104. In this manner, the connector assembly 10 attaches one end of the stabilizer bar 100 to a control arm 104. A similar connector assembly can attach the opposite end of stabilizer bar 100 to a respective control arm.

Figure 3:
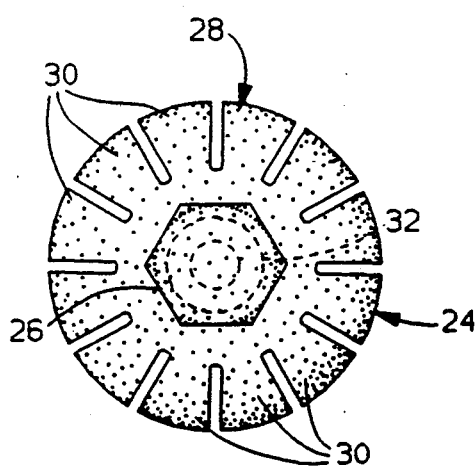
FIG. 3 is a bottom plan view of the nut element illustrating a hexagonal circumference on a stem to facilitate tightening of the nut member.

As seen best in FIG. 3, the outer circumference of the stem 26 of the nut member 24 is preferably formed as a hexagon or other desirable shape to facilitate the use of a wrench or other tool to tighten the nut member 24.

Figure 4:
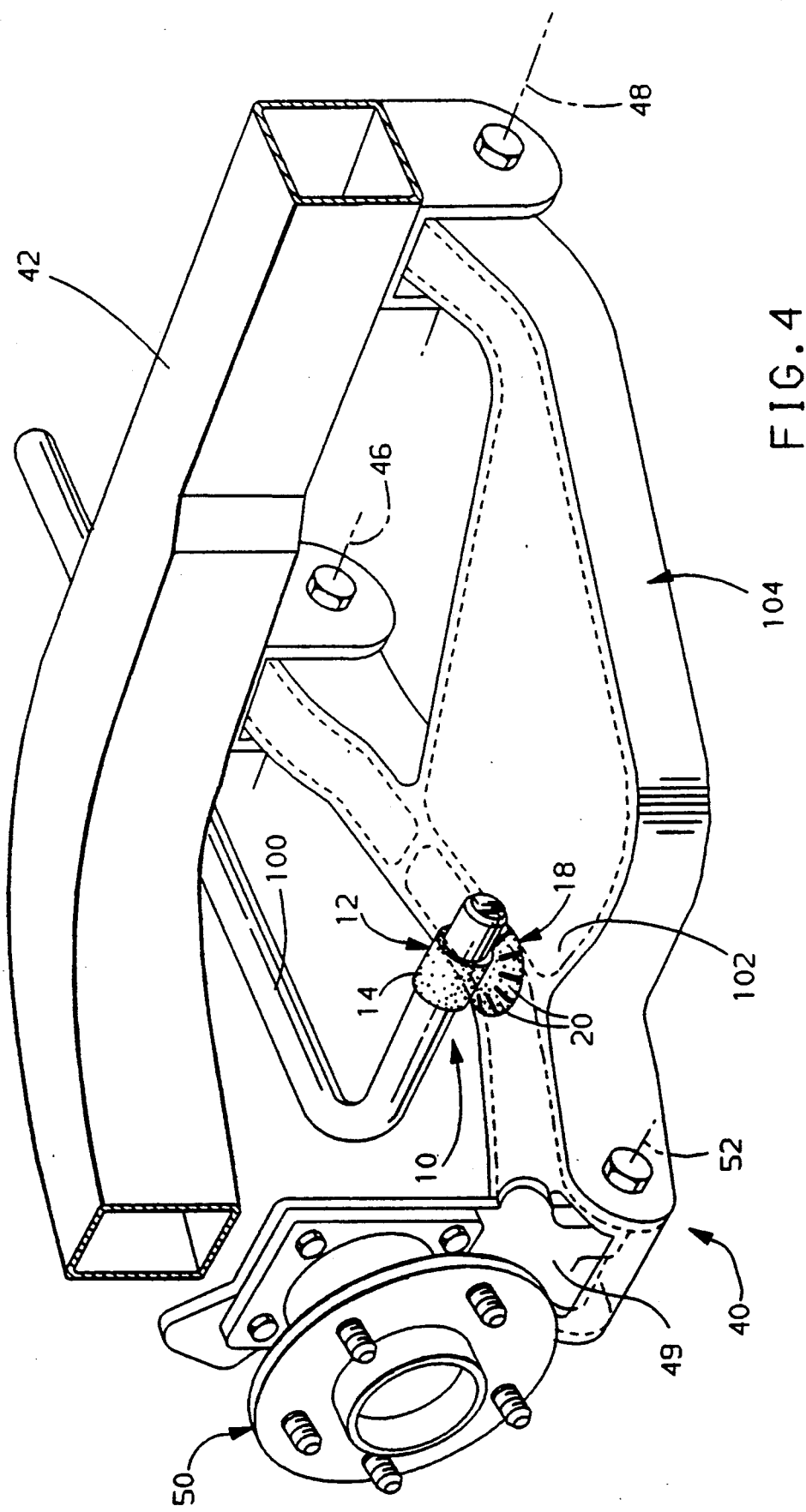
FIG. 4 is a perspective view of an automotive suspension system wherein the connector assembly of FIGS. 1-3 attaches an end of a stabilizer bar to a control arm.

An automotive suspension system is partially illustrated in FIG. 4 and designated generally at 40. The suspension system 40 includes a rigid frame member 42 aligned with a longitudinal axis of a vehicle. A control arm 104 is pivotally mounted to the frame 42 at a first end by pivot axes 46 and 48. At the opposite end, the control arm 104 is pivotally connected to a knuckle 49 which supports a wheel mounting assembly 50 by pivot axis 52. As a wheel (not illustrated) mounted on the wheel mounting assembly 50 travels up and down, the control arm 104 pivots with respect to the frame 42 in a well-known manner.

The connector assembly 10 described above removably connects an end of the stabilizer bar 100 to the control arm 104. As the control arm 104 pivots due to input from the wheel assembly 50, the movement is transmitted to the stabilizer bar 100 by the connector assembly 10. The spring effect in the stabilizer bar 100 is then transmitted to the opposite end where a second connector assembly 10 (not illustrated) is mounted on an opposite control arm of the vehicle.

Figure 5:
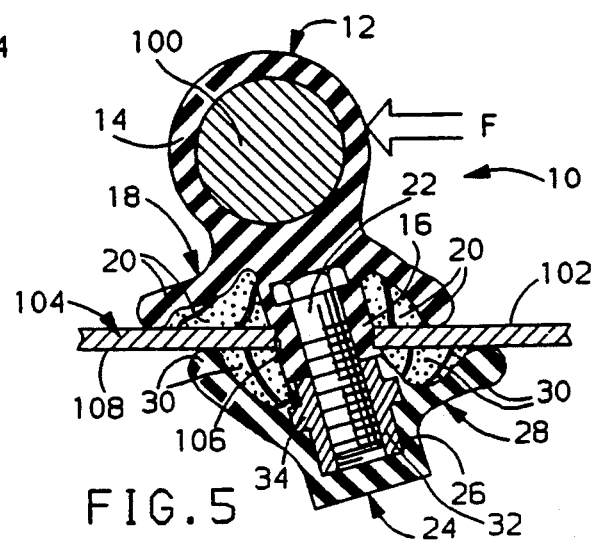
FIG. 5 is a sectional view of the connector assembly illustrating the deformation of the cap and nut members resulting from the angular displacement of the stabilizer bar.

The resiliency of the cap and nut members 12, 24 and their respective bases 18, 28 accommodates the angular displacement of the stabilizer bar 100, as illustrated in FIG. 5. As the stabilizer bar 100 is angularly displaced due to road inputs from the control arm 104, the resilient characteristic of the bases 18, 28 and the respective tabs 20, 30 yieldably supports the connector assembly 10 on the control arm 104. For example, as a force F displaces the stabilizer bar to the left in FIG. 5, the tabs 20, 30 yieldably retain the connection between the stabilizer bar 100 and the control arm 104. When the force F is removed, the resilient tabs 20, 30 urge the cap and nut members 12, 14 into their undeformed positions. During all positions of the cap member 12, the barrel portion 14 permits rotation of the stabilizer bar 100.

The present connector assembly 10 provides an economical and easy-to-install improved linkage which is suitable for conventional suspension systems. Although the present invention has been described with reference to a preferred embodiment, workers skilled in the art will recognize that changes may be made in form and detail without departing from the spirit and scope of the invention. For example, the threaded bolt 22 can extend from the stem 26 of the nut member 24, while the sleeve 32 is retained in the stem 16 of the cap member 12. Other mating fasteners, e.g., snap-fit fasteners can be substituted for the bolt 22 and sleeve 32.

The embodiments of the invention in which an exclusive property or privilege is claimed are defined as follows:

1. In combination, a vehicular stabilizer bar and a connector assembly for mounting the stabilizer bar to a support, the connector assembly comprising:
   (a) cap means formed from a resilient material, the cap means including
      (i) barrel means for receiving the stabilizer bar,
      (ii) first fastener means attached to the barrel portion; and
      (iii) first base means, including a stem and an annular resilient base around the stem, integrally molded to the barrel portion for yieldably supporting the barrel means and the first fastener means; and
   (b) nut means formed from a resilient material, the nut means including
      (i) second fastener means for mating with the first fastener means, and
      (ii) second base means for yieldably supporting the second fastener means.

2. The connector assembly specified in claim 1 wherein the resilient base is slitted to form a plurality of tabs.

3. The connector assembly specified in claim 1 wherein the barrel means rotatably receives the stabilizer bar.

4. The connector assembly specified in claim 1 wherein:
   (a) the first fastener means is a male fastener, and
   (b) the second fastener means is a complementary female fastener.

5. A connector assembly for attaching a stabilizer bar to a control arm, comprising:
   (a) a cap member having a barrel for receiving the stabilizer bar, a male connection means and a plurality of flexible tabs for yieldably supporting the cap member on a first surface of the control arm; and
   (b) a nut member having female connection means for mating with the male connection means and a plurality of flexible tabs for yieldably supporting the nut member on a second surface of the control arm.

6. The connector assembly specified in claim 5 wherein the male connection means comprises a threaded bolt and the female connection means comprises a complementary threaded sleeve.

7. The connector assembly specified in claim 5 wherein the barrel and the flexible tabs of the cap member are integrally molded from a yieldable material.

8. The connector assembly specified in claim 5 wherein the flexible tabs of the nut member are molded from a yieldable material.

9. In combination, a vehicular stabilizer bar and a linkage assembly for attaching an end of the stabilizer bar on a support, comprising:
   (a) a cap member, molded from a resilient material, having a barrel for receiving a stabilizer bar and a base including flexible tabs for yieldably supporting the cap member on a first surface of a support;
   (b) male fastening means secured to the cap member;

(c) a nut member, molded from a resilient material, having a base including flexible tabs for yieldably supporting the nut member on a second surface of the support; and (d) female fastening means secured to the nut member;

whereby the male and female fastening means mate to removably connect the cap and nut members on a support.

* * * * *